United States Patent [19]
Yajima et al.

[11] Patent Number: 5,387,501
[45] Date of Patent: Feb. 7, 1995

[54] SUPPORT FOR PHOTOGRAPHIC MATERIAL

[75] Inventors: Takatoshi Yajima; Kenji Nakanishi; Hiromitsu Araki; Hideyuki Kobayashi, all of Hino; Yoshioki Okubo, Hohfu; Tetsutaro Hashimura, Hohfu; Hiroshi Naito, Hohfu, all of Japan

[73] Assignee: Konica Corporation, Tokyo, Japan

[21] Appl. No.: 224,061

[22] Filed: Apr. 7, 1994

Related U.S. Application Data

[63] Continuation of Ser. No. 49,139, Apr. 19, 1993, abandoned.

[30] Foreign Application Priority Data

Apr. 27, 1992 [JP] Japan .................................. 4-134195

[51] Int. Cl.$^6$ .............................................. G03C 1/76
[52] U.S. Cl. .................................... 430/533; 428/480; 428/482; 428/483; 428/913; 430/527; 430/529; 430/535
[58] Field of Search ............... 428/480, 482, 483, 913; 430/527, 529, 535, 533

[56] References Cited

U.S. PATENT DOCUMENTS

| | | | |
|---|---|---|---|
| 4,304,851 | 12/1981 | McGrail et al. | 430/533 |
| 4,307,174 | 12/1981 | Noonan et al. | 430/533 |
| 4,828,927 | 5/1989 | Timmerman et al. | 430/533 |
| 4,883,706 | 11/1989 | Grosjean . | |
| 5,071,736 | 12/1991 | Ikenoue et al. . | |

FOREIGN PATENT DOCUMENTS 0275801  7/1988  European Pat. Off. .

*Primary Examiner*—Jack P. Brammer
*Attorney, Agent, or Firm*—Frishauf, Holtz, Goodman & Woodward

[57] ABSTRACT

Disclosed is a support for a photographic material which comprises a multilayer film in which a layer of a copolymerized polyester is laminated on at least one surface of a polyester layer, wherein the copolymerized polyester contains an aromatic dicarboxylic acid having a metal sulfonate group as a copolymer component in an amount of 2 to 7 mole % based on all ester bond units and further a polyalkylene glycol as a copolymer component in an amount of 3 to 10% by weight based on the total weight of a polyester which is a reaction product.

14 Claims, No Drawings

SUPPORT FOR PHOTOGRAPHIC MATERIAL

This application is a continuation of application Ser. No. 08/049,139, filed Apr. 19, 1993 (abandoned).

BACKGROUND OF THE INVENTION

This invention relates to a support for a photographic material, more specifically to a support for a photographic material having excellent recovering property from roll set curl after development processing while maintaining strength.

In recent years, a light-sensitive photographic material has been used for various purposes. For example, it has been known that a light-sensitive material comprising a thin support for a photographic material is effective for miniaturization of a photographing device. However, when a support for a photographic material is made thin, the so-called rigidity is lowered, whereby there is a drawback that conveyability and handling property in a photographing device and in subsequent development processing steps are lowered. In order to solve such a drawback, mechanical strength, particularly elastic modulus of a support for a photographic material is required to be made higher than that of a conventionally used support for a photographic material.

As a conventionally used plastic film support, there may be mentioned representatively triacetyl cellulose (TAC) and polyethylene terephthalate (PET).

A TAC film which has been mainly used as a roll film has characteristics that it has no optical anisotropy and has high transparency, and further excellent characteristic that roll set curl can be straightened after development processing. However, the TAC film has a drawback that mechanical strength is inherently poor, whereby it cannot be made thin.

On the other hand, a PET film has excellent productivity, mechanical strength and dimensional stability so that it has been mainly used as a sheet film such as an X-ray film, However, when the PET film is used in a rolled state which has been generally used in a light-sensitive photographic material, there is a drawback that roll set curl after development processing can hardly be straightened, whereby handling property is poor. Thus, its application range is limited.

As a means of improving recovering property from roll set curl of the PET film, there has been proposed a copolymerized PET film to which hydrophilicity is imparted by using an aromatic dicarboxylic acid having a metal sulfonate group as a copolymer component (see Japanese Provisional Patent Publication No. 244446/1989). However, according to this method, a large amount of the copolymer component should be contained in order to obtain sufficient recovering property from roll set curl, whereby excellent characteristics inherently possessed by PET such as mechanical strength and dimensional stability are lost to lose superiority to TAC.

Further, in Japanese Provisional Patent Publication No. 93937/1992, there has been proposed a light-sensitive photographic material having excellent recovering property from roll set curl and mechanical characteristics such as tear strength and folding endurance due to lamination of polyesters having different water contents. Also, according to this method, a large amount of an aromatic dicarboxylic acid having a metal sulfonate group as a copolymer component should be contained in order to obtain sufficient recovering property from roll set curl, whereby characteristics of a copolymerized polyester layer such as mechanical strength and dimensional stability are lost. Thus, the above method is effective for improving characteristics such as tear strength and folding endurance which are considered to be greatly influenced by property of a polyester layer with a low water content constituting an inner layer, but it is not effective for improving characteristics such as mechanical strength, particularly elastic modulus which is property of a whole film.

SUMMARY OF THE INVENTION

An object of the present invention is to provide a support for a photographic material which can solve these problems and has excellent mechanical strength, particularly high elastic modulus and also recovering property from roll set curl after development processing.

The above object of the present invention can be accomplished by a support for a photographic material which comprises a multilayer film in which a layer of a copolymerized polyester is laminated on at least one surface of a polyester layer, wherein said copolymerized polyester contains an aromatic dicarboxylic acid having a metal sulfonate group as a copolymer component in an amount of 2 to 7 mole % based on all ester bond units and further a polyalkylene glycol as a copolymer component in an amount of 3 to 10% by weight based on the total weight of a polyester which is a reaction product.

DESCRIPTION OF THE PREFERRED EMBODIMENTS

In the following, the present invention is explained in detail.

The support for a photographic material of the present invention comprises a multilayer film in which a copolymerized polyester layer is laminated on at least one surface of a polyester layer or film.

The number of laminated layers constituting the support is not limited, but two layers or three layers are generally preferred from the point of avoiding complication of manufacturing facilities. When three layers are laminated, a polyester layer may be an inner layer and copolymerized polyester layers may be outer layers, or a copolymerized polyester layer may be an inner layer and polyester layers may be outer layers.

The thickness of each layer can be suitably determined depending on the polyester and copolymerized polyester to be used, but the ratio of the total copolymerized polyester layer thickness $d_2$ to the total polyester layer thickness $d_1$ is preferably $0.7 \leq d_2/d_1 3$, more preferably $1 \leq d_2/d_1 \leq 2$, and the thickness of one polyester layer is preferably 50 μm or less, more preferably 40 μm or less.

The support for a photographic material of the present invention may have any thickness by which necessary strength depending on the use can be obtained. For example, the thickness is preferably in the range of 30 to 200 μm, particularly 40 to 120 μm from the points that the support has necessary strength and has superiority to a conventional support for a photographic material. However, the support may be made thicker than the above range by using 4 or more laminated layers, if necessary.

The polyester to be used in the support for a photographic material of the present invention is a polyester comprising an aromatic dibasic acid and a glycol as main constitutional components. The aromatic dibasic acid may include terephthalic acid, isophthalic acid and 2,6-naphthalenedicarboxylic acid, and the glycol may include ethylene glycol, propylene glycol, butanediol, neopentyl glycol, 1,4-cyclohexanedimethanol, diethylene glycol and p-xylylene glycol. As the above polyester, preferred is polyethylene terephthalate comprising terephthalic acid and ethylene glycol as main constitutional components. Further, the polyester may be a copolymer comprising 85 mole % or more of main recurring units of the above polyester and may be blended with other polymers, within the range which does not impair excellent characteristics inherently possessed by the polyester.

The copolymerized polyester to be used in the support for a photographic material of the present invention is a copolymerized polyester comprising an aromatic dicarboxylic acid having a metal sulfonate group as a copolymer component and an aromatic dibasic acid and a glycol as main constitutional components. The aromatic dibasic acid may include terephthalic acid, isophthalic acid and 2,6-naphthalenedicarboxylic acid, and the glycol may include ethylene glycol, propylene glycol, butanediol, neopentyl glycol, 1,4-cyclohexanedimethanol, diethylene glycol and p-xylylene glycol. The aromatic dibasic acid and glycol described above may have a substituent(s). As the above copolymerized polyester, preferred is copolymerized polyethylene terephthalate comprising terephthalic acid and ethylene glycol as main constitutional components.

As the aromatic dicarboxylic acid having a metal sulfonate group, there may be used 5-sodium sulfoisophthalic acid, 2-sodium sulfoisophthalic acid, 4-sodium sulfoisophthalic acid, 4-sodium sulfo-2,6-naphthalenedicarboxylic acid, or ester-forming derivatives shown below:

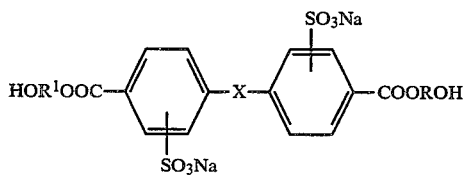

wherein X represents

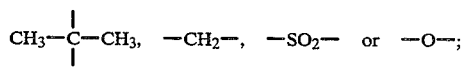

and R and $R^1$ each represent —$(CH_2)_n$— where n represents an integer of 1 to 20,

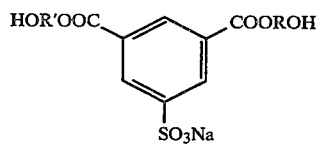

wherein R and R' each represent —$(CH_2)_n$— where n represents an integer of 1 to 20, and a compound in which each of these sodiums is substituted by another metal (e.g. potassium and lithium).

The amount of the copolymer component, the aromatic dicarboxylic acid having a metal sulfonate group is 2 to 7 mole % based on all ester bond units. If the amount is less than 2 mole %, sufficient recovering property from roll set curl cannot be obtained, while if it exceeds 7 mole %, mechanical strength is lowered undesirably.

In the copolymerized polyester to be used in the present invention, a polyalkylene glycol is further contained as a copolymer component in an amount of 3 to 10% by weight based on the total weight of a polyester which is a reaction product. If the amount of the polyalkylene glycol is less than 3% by weight, sufficient recovering property from roll set curl cannot be obtained, while if it exceeds 10% by weight, mechanical strength is poor.

As the polyalkylene glycol, there may be used polyethylene glycol, polytetramethylene glycol and polypropylene glycol, and among them, polyethylene glycol is preferred. Its number average molecular weight is not particularly limited, hut it is preferably 300 to 20,000, more preferably 600 to 10,000, particularly preferably 1,000 to 5,000.

The copolymerized polyester to be used in the support for a photographic material of the present invention may be further copolymerized with other components or may be blended with other polymers, within the range which does not impair the effect of the present invention.

Both of the polyester and the copolymerized polyester to be used in the support for a photographic material of the present invention may contain phosphoric acid, phosphorous acid and esters thereof, and an inorganic particle (e.g. silica, kaolin, calcium carbonate, calcium phosphate and titanium dioxide) during polymerization, and an inorganic particle may be blended with the polymer after polymerization. Further, a dye, a UV absorber or an antioxidant may be suitably added without any problem at any stage of during polymerization and after polymerization.

The copolymerized polyester to be used in the present invention may be obtained according to a conventionally known method. That is, the copolymerized polyester can be obtained by subjecting an aromatic dibasic acid component and a glycol component to ester interchange (transesterification), followed by polycondensation at high temperature under reduced pressure. In the preparation, the aromatic dicarboxylic acid having a metal sulfonate group and polyalkylene glycol which are copolymer components are preferably added to the ester interchange product and then the polycondensation is carried out.

As a method for preparing the support for a photographic material of the present invention, there may be mentioned, for example, a co-extrusion method in which a polyester and a copolymerized polyester are melt extruded from different extruders, the resulting melt polymers are contacted in a laminar flow state in an introducing tube or in an extrusion mouthpiece and then extruded, the extruded material is set by cooling on a cooling drum to obtain an unstretched film, and the unstretched film is stretched biaxially and then heatset, or an extrusion lamination method in which a polyester is melt extruded from an extruder and set by cooling on a cooling drum to obtain an unstretched film, an anchoring agent or an adhesive is coated on the surface of the unstretched film or a monoaxially oriented film obtained by stretching the unstretched film monoaxially, if necessary, a copolymerized polyester is extrusion laminated on said surface, and then the resulting film is stretched biaxially and then heatset. From the point of simplicity and easiness of steps, the co-extrusion method is preferred.

Stretching conditions of the film is not particularly limited. However, it is generally preferred that said conditions are suitably adjusted to conditions of the polyester layer, and stretching is preferably carried out at a temperature range of glass transition temperature (Tg) to Tg+100° C. in biaxial directions at a stretching ratio of 2.5 to 6.0-fold, respectively. Further, heat-set may be carried out at a temperature range of 150° C. to 240° C.

The support for a photographic material of the present invention can be applied to various uses which have been known, and it is particularly useful as a support for a photographic material used for a roll film.

The support for a photographic material of the present invention has at least one silver halide emulsion layer on at least one surface thereof to constitute a light-sensitive silver halide photographic material. The silver halide emulsion layer may be provided directly on the support by coating, or may be provided by coating through another layer, for example, a hydrophilic colloid layer containing no silver halide emulsion.

In order to improve adhesiveness, the support for a photographic material may be subjected to various surface treatments such as corona discharge treatment and chemical treatment, if necessary. In order to further improve adhesiveness, a subbing layer may be provided by coating.

As silver halide constituting the silver halide emulsion layer to be used in the present invention, silver halide having any composition may be used. For example, silver chloride, silver chlorobromide, silver chloroiodobromide, pure silver bromide or silver iodobromide may be included.

To the light-sensitive silver halide photographic material described above, a sensitizing dye, a plasticizer, an antistatic agent, a surfactant or a hardener may be added.

When the light-sensitive silver halide photographic material is subjected to development processing, developers as described in, for example, T. H. James "The Theory of the Photographic Process, Fourth Edition", p. 291 to p. 334, and "Journal of the American Chemical Society", Vol. 73, No. 3, p. 100 (1951) can be used.

EXAMPLES

The present invention is described in detail by referring to Examples.

Methods of measuring values of the respective physical properties in Examples are described below.
Elastic modulus A film was left to stand for more than 4 hours in a room controlled at a temperature of 23° C. and a relative humidity of 55%, and then cut to have a sample width of 10 mm and a length of 200 mm. A tensile test was conducted at a tensile rate of 100 mm/min with a distance between chucks being 100 mm to determine elastic modulus.
Transparency Haze of a film was measured according to JIS K-6714. As property of a support for a photographic material, 3% or less is preferred in practical use.
Recovering property from roll set curl A film having a sample size of 12 cm×35 mm was wound around a core with a diameter of 10 mm, and the wound film was treated at 55° C. and 20% RH (relative humidity) for 3 days to form roll set curl of the film. Thereafter, the film was released from the core and dipped in pure water of 38° C. for 15 minutes, and then the film was loaded with 50 g and dried for 3 minutes by means of a hot air dryer at 55° C. Then, the load was removed from the film and the film was hung perpendicularly. A distance between both ends of the hung film was measured and a recovering rate from roll set curl based on the original length of 12 cm was evaluated.

Example 1

To 100 parts by weight of dimethyl terephthalate and 64 parts by weight of ethylene glycol was added 0.1 part by weight of a hydrate of calcium acetate, and the mixture was subjected to ester interchange reaction according to a conventional manner. To the resulting product were added 28 parts by weight (5 mole %/all ester bond units) of an ethylene glycol solution of 5-sodium sulfodi($\beta$-hydroxyethyl)isophthalate (concentration: 35% by weight), 8.1 parts by weight (7% by weight/polymer) of polyethylene glycol (number average molecular weight: 3,000), 0.05 part by weight of antimony trioxide and 0.13 part by weight of trimethyl phosphate. Subsequently, the temperature of the mixture was gradually elevated and the pressure thereof was gradually reduced. Then, the mixture was polymerized at 280° C. and 0.5 mmHg to obtain a copolymerized polyester.

The copolymerized polyester and a commercially available polyethylene terephthalate (intrinsic viscosity: 0.65) were dried under vacuum at 150° C., respectively, and then melt extruded at 285° C. by using three extruders. The resulting extruded melt polymers were so contacted in a layer state in a T die that the respective three layers comprised the materials shown in Table 1, and set by quenching on a cooling drum to obtain laminated unstretched films. By controlling the extruded amounts of the respective materials, the thicknesses of the respective layers were changed as shown in Table 1. Subsequently, the films were stretched by 3.5-fold in the longitudinal direction at 85° C., stretched by 3.5-fold in the lateral direction at 95° C. and then heatset at 210° C. to obtain biaxially stretched films having a thickness of 80 μm. Characteristic values of said films are as shown in Table 1.

TABLE 1

| Sample No. | Layer structure (A: copolymerized polyester B: polyester) | ratio of respective layer thickness | Total copolymerized polyester layer thickness to total polyester layer thickness ($d_2/d_1$) | Recovering rate from roll set curl (%) | Elastic modulus (kg/mm$^2$) | Haze (%) |
|---|---|---|---|---|---|---|
| 1 | A/B/A | 1/1/1 | 2 | 90 | 500 | 0.5 |
| 2 | A/B/A | 1/2/1 | 1 | 60 | 530 | 0.5 |
| 3 | A/B/A | 1/3/1 | 0.67 | 35 | 530 | 0.4 |
| 4 | A/B/A | 1/4/1 | 0.5 | 30 | 550 | 0.4 |
| 5 | A/B/A | 2/1/2 | 4 | 95 | 380 | 0.6 |

TABLE 1-continued

| Sample No. | Layer structure (A: copolymerized polyester B: polyester) | ratio of respective layer thickness | Total copolymerized polyester layer thickness to total polyester layer thickness ($d_2/d_1$) | Recovering rate from roll set curl (%) | Elastic modulus (kg/mm$^2$) | Haze (%) |
|---|---|---|---|---|---|---|
| 6 | A/B/A | 2/1/1 | 3 | 90 | 460 | 0.6 |
| 7 | A/A/B | 1/1/1 | 2 | 90 | 500 | 0.5 |
| 8 | A/A/B | 1/1/2 | 1 | 80 | 540 | 0.4 |
| 9 | B/A/B | 1/1/1 | 0.5 | 30 | 540 | 0.5 |
| 10 | B/A/B | 1/2/1 | 1 | 50 | 500 | 0.5 |
| 11 | A/A/A | 1/1/1 | ∞ | 95 | 350 | 0.6 |
| 12 | B/B/B | 1/1/1 | 0 | 15 | 550 | 0.3 |

From the results in Table 1, the films comprising a single material, i.e. the copolymerized polyester or the polyester alone are poor in either recovering rate from roll set curl or elastic modulus, but the films in which the both materials are laminated and particularly the ratio of the respective layer thicknesses is controlled to a range specified in the present invention have good recovering rate from roll set curl and elastic modulus.

Photographic films prepared by providing light-sensitive photographic layers on these film supports according to a conventional method had good characteristics without any particular problem in practical use.

Example 2

In the same manner as in Example 1 except for changing the ethylene glycol solution of 5-sodium sulfodi(β-hydroxyethyl)isophthalate (concentration: 35% by weight) and polyethylene glycol (number average molecular weight: 3,000) as shown in Table 2 and changing the ratio of the respective layer thicknesses as in Sample No. 1, biaxially stretched films having a thickness of 80 μm were obtained. Characteristic values of the films are as shown in Table 2, and the samples within the scope of the present invention are good films.

C. and 0.5 mmHg to obtain a copolymerized polyester having an intrinsic viscosity of 0.55.

By using the copolymerized polyester and a commercially available polyethylene terephthalate (intrinsic viscosity: 0.65), in the same manner as in Example 1, a biaxially stretched film having a thickness of 80 μm was so prepared that the film had the same layer structure and thickness ratio as those of Sample No. 1. The biaxially stretched film obtained was colored in yellow and had a haze value as high as 5%. Thus, quality of the film as a support for a photographic material was low.

As described above in detail, according to the present invention, there can be provided a support for a photographic material having excellent mechanical strength, particularly high elastic modulus and also recovering property from roll set curl after development processing.

We claim:

1. A support for a photographic material which comprises a multilayer film in which a layer of a copolymerized polyester is laminated on at least one surface of a polyester layer, wherein said polyester is obtained by reacting a first aromatic dibasic acid selected from the group con-

TABLE 2

| Sample No. | Polyalkylene glycol | | Aromatic dicarboxylic acid having metal sulfonate group | | Recovering rate from roll set curl (%) | Elastic modulus (kg/mm$^2$) | Haze (%) |
|---|---|---|---|---|---|---|---|
| | Amount added (part by weight) | Copolymer component (% by weight/polymer) | Amount added (part by weight) | Copolymer component (mole %/ all ester bond units) | | | |
| 13 | 7.7 | 7 | 0 | 0 | 20 | 530 | 1.8 |
| 14 | 7.9 | 7 | 11 | 2 | 55 | 530 | 1.4 |
| 15 | 8.0 | 7 | 16 | 3 | 80 | 520 | 0.9 |
| 16 | 8.3 | 7 | 39 | 7 | 90 | 460 | 0.5 |
| 17 | 8.5 | 7 | 52 | 9 | 95 | 350 | 0.4 |
| 18 | 0 | 0 | 16 | 3 | 20 | 520 | 0.6 |
| 19 | 3.4 | 3 | 16 | 3 | 50 | 500 | 0.5 |
| 20 | 12 | 10 | 16 | 3 | 90 | 450 | 0.5 |
| 21 | 15 | 12 | 16 | 3 | 90 | 360 | 0.5 |

Comparative example 100 parts by weight of dimethyl terephthalate, 70 parts by weight of ethylene glycol, 10 parts by weight of 5-sodium dimethyl sulfoisophthalate, 10 parts by weight of polyethylene glycol (number average molecular weight: 4,000), 0.1 part by weight of calcium acetate, 0.03 part by weight of antimony trioxide and 0.2 part by weight of Irganox 1010 (trade name, produced by CIBA-GEIGY AG) were mixed, and the mixture was subjected to ester interchange reaction according to a conventional manner. To the resulting product was added 0.1 part by weight of trimethyl phosphate. Subsequently, the temperature of the mixture was gradually elevated and the pressure thereof was gradually reduced, and the mixture was polymerized finally at 280° sisting of terephthalic acid, isophthalic acid and 2,6-naphthalenedicarboxylic acid, with a glycol selected from the group consisting of ethylene glycol, propylene glycol, butanediol, neopentyl glycol, 1,4-cyclohexanedimethanol, diethylene glycol and p-xylene glycol, wherein said copolymerized polyester comprises:

a) said first aromatic dicarboxylic acid, b) said glycol, c) a second aromatic dicarboxylic acid selected from the group consisting of terephthalic acid, isophthalic acid, 2,6-naphthalenedicarboxylic,

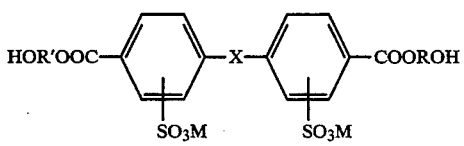

and

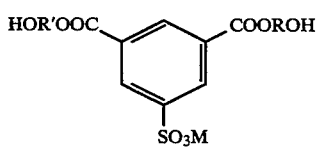

wherein X represents

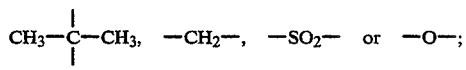

R and $R^1$ each represent $-CH_2)_n-$ where n represents an integer of 1 to 20; M represents sodium, potassium or lithium, wherein said terephthalic acid, said isophthalic acid or said 2,6-naphthalenedicarboxylic acid has a metal sulfonate group, and an amount of said second aromatic dicarboxylic acid is 2 to 7 mole % based on all ester bond units of said copolymerized polyester, and further d) a polyalkylene glycol selected from the group consisting of a polyethylene glycol, a polypropylene glycol and a polytetramethylene glycol, in an amount of 3 to 10% by weight based on the total weight of said copolymerized polyester, wherein each of said first and second aromatic dibasic acids, said glycol, said polyethylene glycol and said polytetramethylene glycol may have a substituent, wherein a ratio of the total copolymerized polyester layer thickness $d_2$ to the total polyester layer thickness $d_1$ is $0.7 \leq d_2/d_1 \leq 3$.

2. The support of claim 1 wherein the ratio of the total copolymerized polyester layer thickness $d_2$ to the total polyester layer thickness $d_1$ is $1 \leq d_2/d_1 \leq 2$, and the thickness of one polyester layer is 40 μm or less.

3. The support of claim 1 wherein the support comprises two or three layers.

4. The support of claim 1 wherein the support comprises three layers, and the inner layer is the polyester layer and the outer layers are the copolymerized polyester layers.

5. The support of claim 1 wherein the support comprises three layers, and the inner layer is the copolymerized polyester layer and the outer layers are the polyester layers.

6. The support of claim 1 wherein the aromatic dicarboxylic acid having a metal sulfonate group is 5-sodium sulfoisophthalic acid, 2-sodium sulfoisophthalic acid, 4-sodium sulfoisophthalic acid, 4-sodium sulfo-2,6-naphthalenedicarboxylic acid, an ester-forming derivative thereof or a compound in which each of these sodiums is substituted by another metal.

7. The support of claim 1 wherein the polyalkylene glycol is polyethylene glycol, polytetramethylene glycol or propylene glycol having a number average molecular weight of 300 to 20,000.

8. The support of claim 1 wherein a laminated film is stretched at a temperature range of glass transition temperature (Tg) to Tg+100° C. in biaxial directions at a stretching ratio of 2.5 to 6.0-fold, respectively, and then heatset at a temperature range of 150° C. to 240° C.

9. The support of claim 1 which has a thickness of 40 to 120 μm.

10. The support of claim 1 wherein said polyester is polyethylene terephthalate comprising terephthalic acid and ethylene glycol.

11. The support of claim 1 wherein said copolymerized polyester contains a copolymerized polyethylene terephthalate as a main constitutional component.

12. The support of claim 1 wherein the polyalkylene glycol is polyethylene glycol.

13. The support of claim 1 wherein the polyalkylene glycol is polypropylene glycol.

14. The support of claim 1 wherein the polyalkylene glycol is polytetramethylene glycol.

* * * * *